United States Patent [19]

Koetsier

[11] 4,427,577

[45] Jan. 24, 1984

[54] COMPOSITE ZEOLITE

[75] Inventor: Wicher T. Koetsier, Mijnsheerenland, Netherlands

[73] Assignee: Exxon Research & Engineering Co., Florham Park, N.J.

[21] Appl. No.: 327,175

[22] Filed: Dec. 4, 1981

[30] Foreign Application Priority Data

Dec. 12, 1980 [GB] United Kingdom ............... 8039997

[51] Int. Cl.$^3$ .............................................. B01J 29/28
[52] U.S. Cl. ........................................ 502/66; 208/111; 502/70; 502/74
[58] Field of Search ................... 252/455 Z; 423/328, 423/335

[56] References Cited

U.S. PATENT DOCUMENTS

| | | | |
|---|---|---|---|
| 3,702,886 | 11/1972 | Argauer et al. | 423/328 |
| 3,709,979 | 1/1973 | Chu | 423/328 |
| 3,730,910 | 5/1973 | Albers et al. | 252/455 Z |
| 3,790,471 | 2/1974 | Argauer et al. | 208/111 |
| 3,804,747 | 4/1974 | Kimberlin, Jr. et al. | 252/455 Z |
| 3,941,871 | 3/1976 | Dwyer et al. | 423/326 |
| 4,061,724 | 12/1977 | Grose et al. | 423/335 |
| 4,073,865 | 2/1978 | Flanigen et al. | 423/339 |
| 4,090,981 | 5/1978 | Rodewald | 252/455 |
| 4,104,294 | 8/1978 | Grose et al. | 260/448 |
| 4,108,881 | 8/1978 | Rollmann et al. | 260/448 |
| 4,139,600 | 2/1979 | Rollmann et al. | 423/329 |
| 4,163,028 | 7/1979 | Tabak et al. | 585/481 |
| 4,175,114 | 11/1979 | Plank et al. | 423/329 |
| 4,199,556 | 4/1980 | Plank et al. | 423/329 |
| 4,208,305 | 6/1980 | Kouwenhoven et al. | 252/431 |
| 4,251,348 | 2/1981 | O'Rear et al. | 208/61 |
| 4,340,465 | 7/1982 | Miller et al. | 208/120 |
| 4,354,924 | 10/1982 | Miller | 208/120 |
| 4,362,653 | 12/1982 | Robinson | 252/455 R |

FOREIGN PATENT DOCUMENTS

| | | |
|---|---|---|
| 859656 | 2/1978 | Belgium . |
| 880858 | 2/1980 | Belgium . |
| 5909 | 12/1979 | European Pat. Off. . |
| 14059 | 6/1980 | European Pat. Off. . |
| 1553209 | 9/1976 | United Kingdom . |
| 2023562 | 1/1980 | United Kingdom . |
| 2024790 | 1/1980 | United Kingdom . |
| 2033358 | 5/1980 | United Kingdom . |
| 1574840 | 9/1980 | United Kingdom . |

OTHER PUBLICATIONS

D. M. Bibby et al., "Nature", vol. 280, pp. 664–665.
Abstract of S. Africa, 756,744.
Abstract of S. Africa, 756,745.

Primary Examiner—Carl F. Dees
Attorney, Agent, or Firm—R. Yablonsky

[57] ABSTRACT

Catalyst compositions comprising a core of silica with an overlying modified-silica zeolite, preferably containing aluminium, gallium or boron, show improved catalytic activity. The composites are prepared by introducing preformed silica particles, preferably with a crystallite size greater than 0.1 μ, into a reaction mixture comprising a silicon source, a source of the modifying element, and preferably an organic template such as a tetraalkylammonium compound to form the modified-silica zeolite with a constraint index of from 1 to 12. The weight ratio of the silica core to $SiO_2$ in the reaction mixture is preferably 1:1 to 10:1.

24 Claims, 10 Drawing Figures

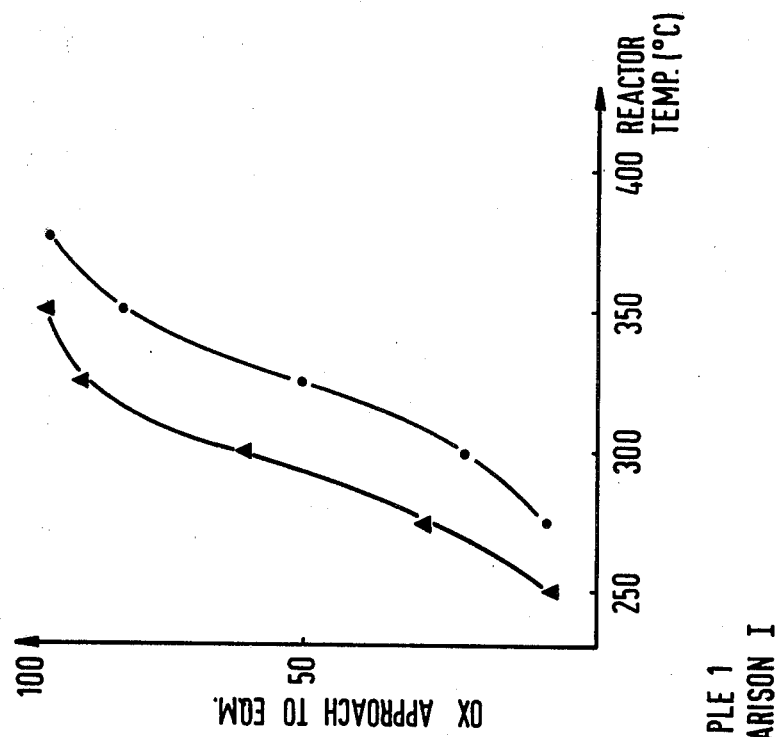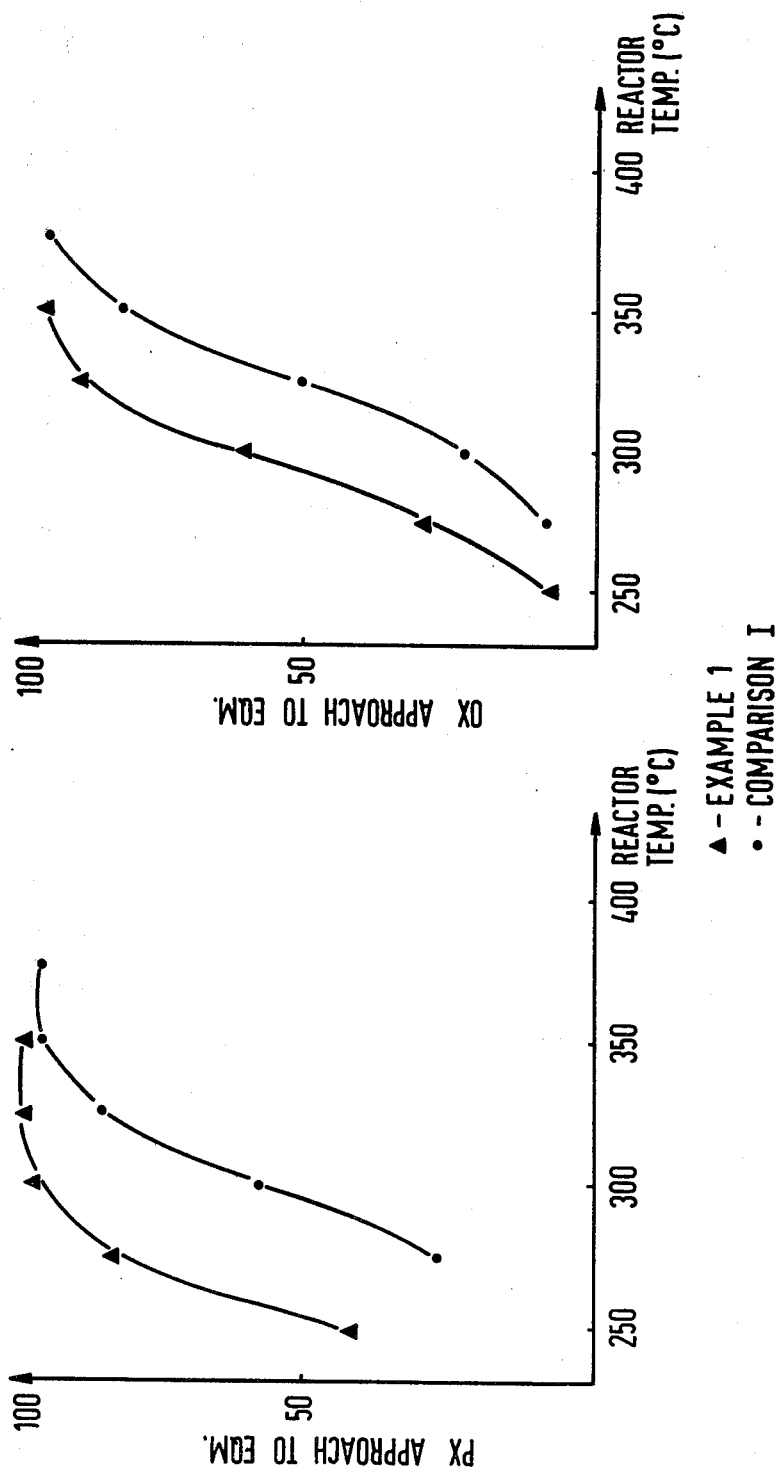

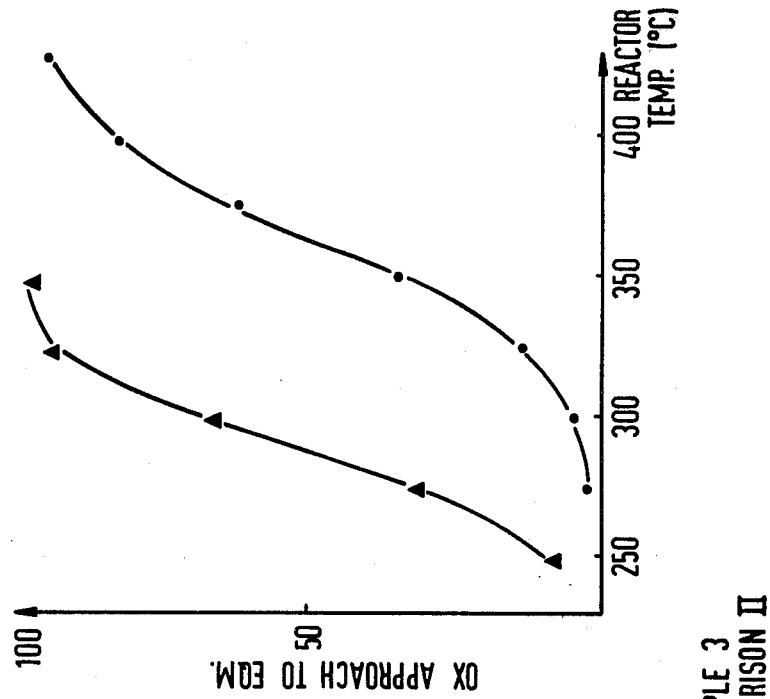
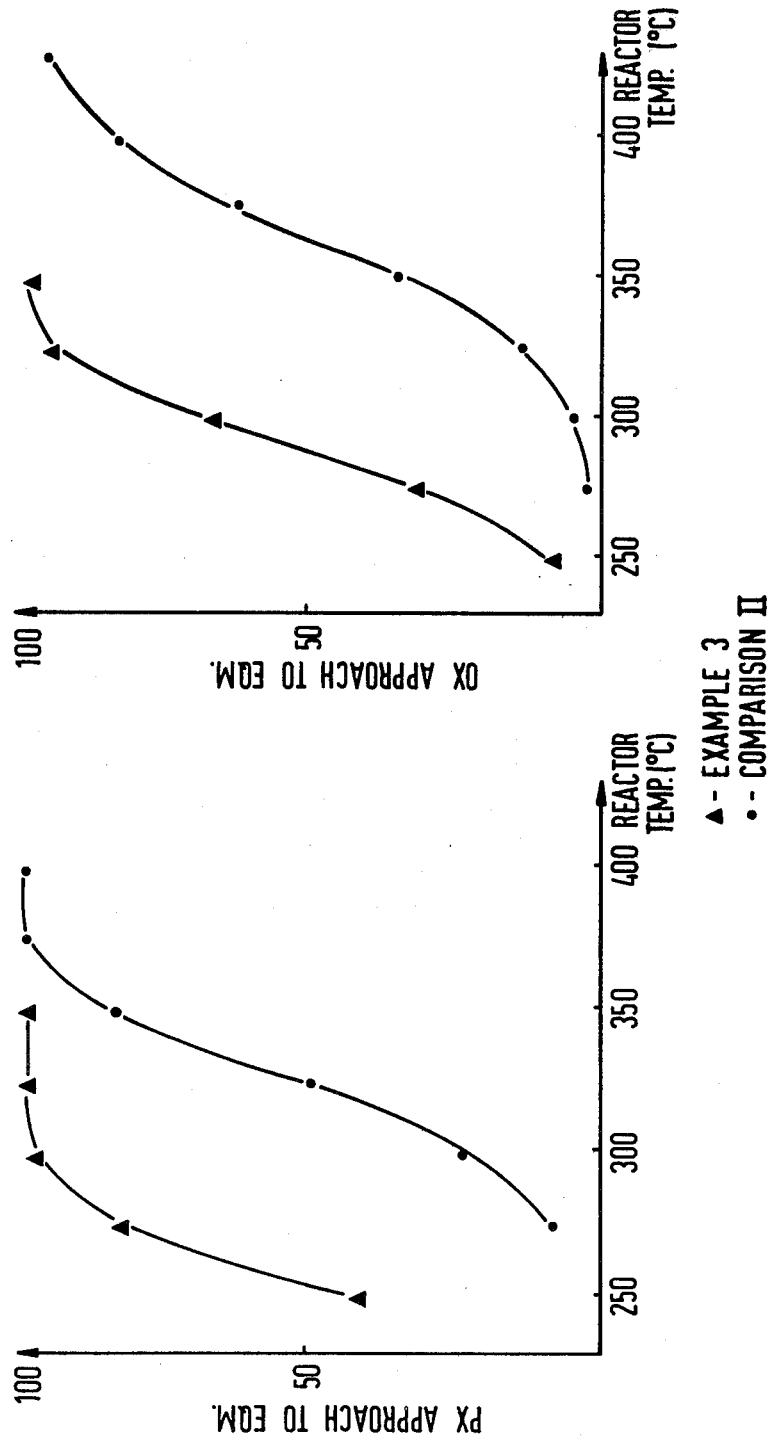

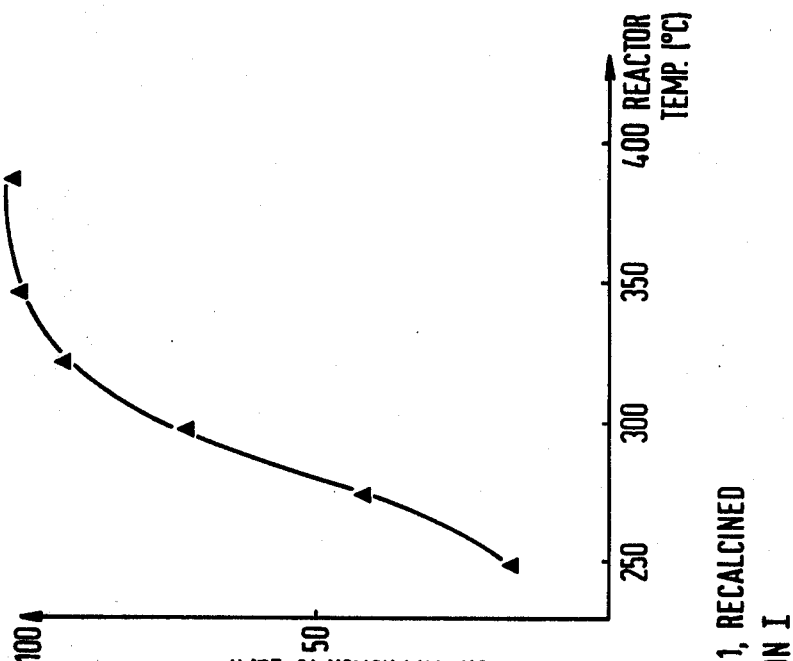
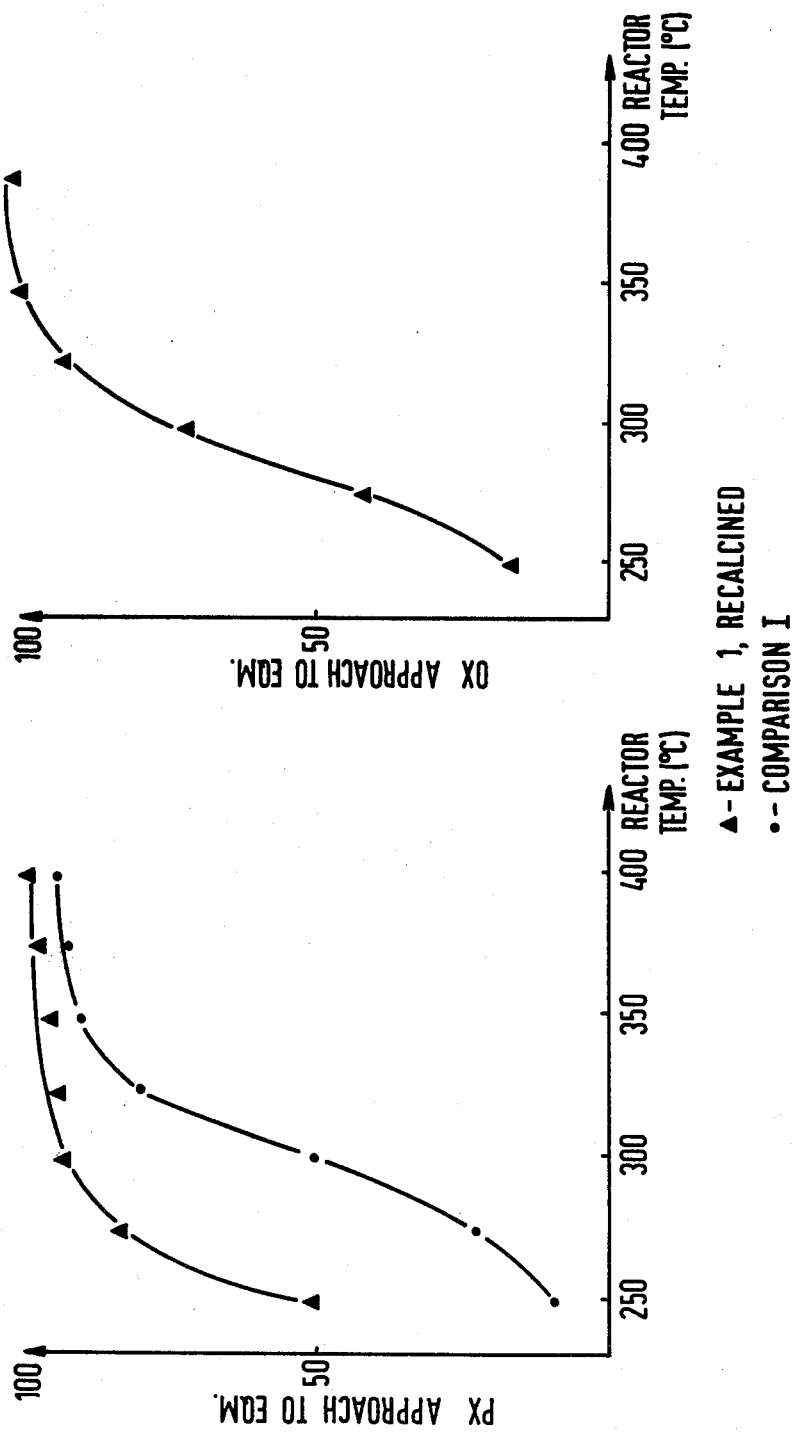

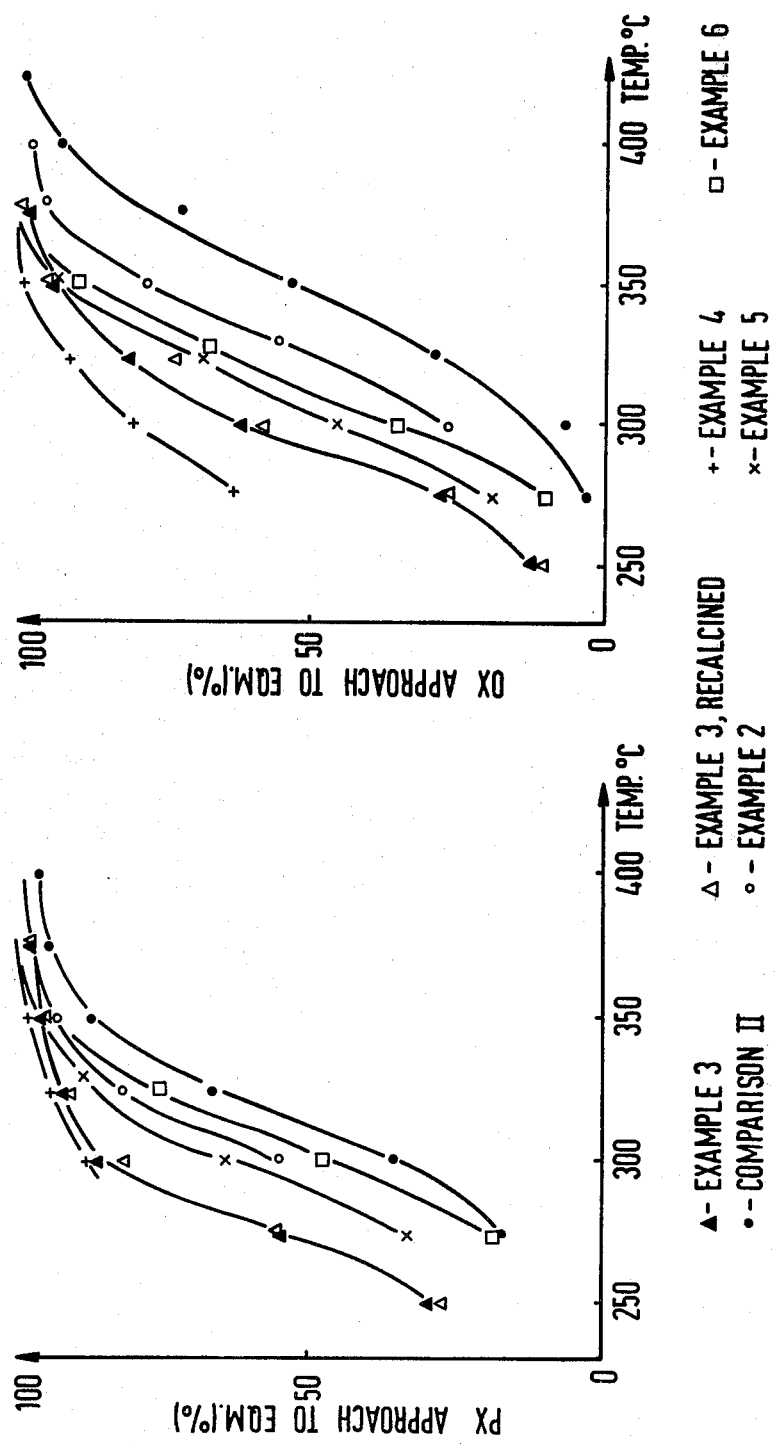

COMPOSITE ZEOLITE

This invention relates to a composite zeolite comprising crystalline silica particles having a zeolite deposited on the outer surface thereof.

Zeolites have been known for some time as catalysts in hydrocarbon conversions. Naturally occuring zeolites are crystalline aluminosilicates with a characteristic porous structure made up of a three dimensional network of $SiO_4$ and $AlO_4$ tetrahedra cross-linked by shared oxygen atoms. Synthetic zeolites have been prepared with a variety of structures and aluminium contents, and in recent years zeolites have been prepared with particularly high silica contents, even to the extent of being substantially aluminium-free. In addition, zeolite structures have been synthesized with other elements replacing aluminium in the tetrahedral array.

The catalytic activity of zeolites relies on their acidity. Non-tetravalent atoms within the tetrahedral array, such as trivalent aluminium, gallium or boron, create a positive charge deficiency, which can be compensated by a cation such as $H^+$. In addition, the cavities and channels through the crystalline structure of the zeolite enable the materials to act as selective molecular sieves particularly if the dimensions of the channels fall within a range which enables the diffusion of large molecules to be controlled. Thus, acidic zeolites may be used as selective catalysts, and there are numerous publications describing such catalysts. By way of example, U.S. Pat. No. 3,790,471 concerns a process for conversion of hydrocarbon using an aluminosilicate zeolite identified as "ZSM-5" which is characterized by molar ratios of the constituent oxides and by its X-ray spectrum.

There are a number of publications of active zeolite catalysts in which a second component is deposited or exchanged onto the active zeolite to give an impregnated product with modified properties. For example, U.S. Pat. No. 4,090,981 assigned to Mobil Oil Corporation describes a porous crystalline aluminosilicate zeolite having a coating of silica thereover. Published European Application No. 5909 of the British Petroleum Company Limited describes an aluminosilicate catalyst having a gallium compound deposited thereon or having been exchanged with gallium ions.

U.S. Pat. Nos. 4,175,114 and 4,199,556, both assigned to Mobil Oil Corporation, describe crystallization of ZSM-5 or ZSM-11 deficient in nitrogen in the presence of a seed of the desired zeolite and/or ammonium hydroxide and/or an alcohol.

As the aluminium content of an aluminosilicate zeolite is decreased the density of acid sites, and thus the catalytic activity, is reduced. If a low-aluminium zeolite is to be used as a catalyst it is necessary to operate at increased temperature. For example, U.S. Pat. No. 4,163,028 describes a process for converting a xylene/ethylbenzene feed using a zeolite having a silica:alumina ratio of at least 500 in which the conversion requires a temperature of at least 800° F. (427° C.). Silica polymorphs having zeolite structures, such as "Silicalite" described in U.S. Pat. Nos. 4,061,724 and 4,073,865 have substantially no acid sites and would be expected to act as catalysts only at very high temperatures.

This invention provides a catalyst composition comprising a crystalline modified-silica having a constraint index (as defined hereinafter) of from 1 to 12 overlying a silica core having substantially the same crystalline structure as the modified-silica.

It has been found that a surprisingly effective acidic zeolite catalyst may be obtained by applying a modified silica zeolite to a crystalline silica core which because it has only a few acid sites has little catalytic activity per se and requires much higher conversion temperatures for conversion under similar conditions of throughput, pressure and the amount of catalyst. Moreover, the resultant composite zeolite catalyst has been found to display advantages in acid-catalysed hydrocarbon conversions when compared to the modified-silica zeolite alone or to the silica alone.

The silica core may be a silica polymorph of analogous structure to a zeolite or a highly siliceous zeolite, but in each case with very low levels of metal substitution within the silica framework. Preferred forms of the silica core are polymorphs or zeolites in which the ratio of silicon to modifying elements in the tetrahedral framework is greater than 500, and more preferably greater than 5000 and approaches infinity. The core material may contain small amounts of other elements as impurities which do not form part of the tetrahedral structure and do not contribute to the catalytic activity of the silica. For example, suitable silicas may contain aluminium in amounts of up to 0.3 wt%, where this is occluded in a separate phase, and have little catalytic activity. Such silicas may be used in the invention.

The silica core and overlying modified-silica zeolite have substantially the same crystalline structures, and thus the silica core and the complete composite catalyst display substantially the same X-ray diffraction patterns. Although there may be minor shifts in the position or resolution of some lines in the spectrum, it will be apparent to one skilled in the art that the structures of the two materials are substantially the same.

The "constraint index" is a measure of the degree of access of larger molecules to the zeolite and may be determined by passing continuously a mixture of an equal weight of normal hexane and 3-methylpentane over a small sample, approximately 1 gram or less, or catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000° F. for at least 15 minutes. The catalyst is then flushed with helium and the temperature adjusted between 550° and 950° F. (287° C. to 510° C.) to give an overall conversion between 10 and 60%. The mixture of hydrocarbons is passed at 1 liquid hourly space velocity (i.e., 1 volume of liquid hydrocarbon per volume of catalyst per hour) over the catalyst with a helium dilution to give a helium to total hydrocarbon mole ratio of 4:1. After 20 minutes on stream, a sample of the effluent is taken and analysed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The core may, for example, be a crystalline silica polymorph which has, after calcination in air for at least one hour at 600° C., a mean refractive index of $1.39 \pm 0.01$ and a specific gravity at 25° C. of $1.70 \pm 0.05$.

In one preferred form the polymorph has an X-ray powder diffraction pattern in which the six strongest d-values are:

11.1±0.2 Å

10.0±0.2 Å

3.85±0.07 Å

3.82±0.07 Å

3.76±0.05 Å

3.72±0.05 Å

This preferred silica polymorph is known as "Silicalite", and is described in U.S. Pat. No. 4,061,724 assigned to Union Carbide Corporation.

The pore diameter of Silicalite is about 6 Å and the pore volume is typically 0.18 ml/g determined by adsorption.

Silicalite may be prepared by the process described in U.S. Pat. No. 4,061,724 which consists of a hydrothermal crystallization from an aqueous reaction mixture containing a silica source and an alkonium compound of pH 10–14 to form a hydrous precursor, followed by calcining the precursor. However, Silicalite may alternatively be prepared by a generally similar process but in the absence of alkonium compounds.

A second preferred form of silica polymorph related to Silicalite has, in addition to the refractive index and specific gravity characteristics given above, following calcination in air for at least one hour at 600° C. an adsorptive capacity for water vapours at 23° C. and a water vapour pressure of 4.6 mm Hg of less than 1 wt %, an infra-red spectrum which exhibits a substantial absence of absorption in the region 3700–3100 cm$^{-1}$, and an X-ray powder diffraction pattern containing at least the following d-values:

11.1±0.2 Å

10.0±0.2 Å

9.75±0.1 Å

3.85±0.04 Å

3.82±0.04 Å

3.71±0.02 Å

3.62±0.02 Å and an absence of reflections intermediate the reflections corresponding to d-spacing of 3.82±0.04 Å and 3.71±0.02 Å.

This second form of preferred silica polymorph is described and claimed in U.S. Pat. No. 4,073,865 assigned to Union Carbide Corporation. The polymorph may be prepared by the process as described in U.S. Pat. No. 4,073,865, which employs a reaction mixture having a pH below 11, preferably within the range 7 to 11, more preferably 7.4 to 10, which reaction mixture contains from 150 to 1500 moles H$_2$O, from 13 to 50 moles SiO$_2$, from 2 to 12 moles of fluoride ion and from 0 to 20 moles, preferably from 0 to 6 moles, of M$_2$O wherein M represents an alkali metal cation, each of the aforesaid reagents being present per mole of Q$_2$O wherein Q represents a quaternary cation having the formula (R$_4$X)$^+$, in which each R represents hydrogen or an alkyl group containing from 2 to 6 carbon atoms, and X represents phosphorus or nitrogen. The reaction mixture is heated at a temperature of from 100° C. to 250° C. until a crystalline hydrated precursor is formed, usually after about 50 to 150 hours, then the crystalline precursor is isolated and calcined at a temperature of from 400° C. to 1000° C. The silica polymorph may, however, alternatively be prepared in the absence of the compound Q$_2$O.

The core may also be the silicate resulting from thermal treatment at a temperature of from 200° C. to 600° C. for from 1 to 48 hours of a crystal metal organosilicate having a composition, in its anhydrous state, in terms of mole ratios of oxides as follows:

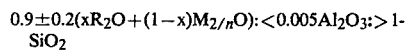

where M is sodium or sodium in combination with tin, calcium, nickel or zinc, R is a tetraalkylammonium and x is a number greater than 0 but not exceeding 1, the organosilicate having the characteristic X-ray diffraction lines of the ZSM-5 zeolite-that is to say:

| Interplanar spacing d (Å) | | Relative Intensity |
|---|---|---|
| 11.1 | ± 0.2 | s |
| 10.0 | ± 0.2 | s |
| 7.4 | ± 0.15 | w |
| 7.1 | ± 0.15 | w |
| 6.3 | ± 0.1 | w |
| 6.04 | } ± 0.1 | w |
| 5.97 | | |
| 5.56 | ± 0.1 | w |
| 5.01 | ± 0.1 | w |
| 4.60 | ± 0.08 | w |
| 4.25 | ± 0.08 | w |
| 3.85 | ± 0.07 | vs |
| 3.71 | ± 0.05 | s |
| 3.04 | ± 0.03 | w |
| 2.99 | ± 0.02 | w |
| 2.94 | ± 0.02 | w |

A silica of this type is described and claimed in U.S. Pat. No. 3,941,871 assigned to Mobil Oil Corporation.

The silica core may also be a crystalline silica having the characteristic X-ray diffraction pattern of the zeolite ZSM-11:

| Interplanar spacing d (Å) | | Relative Intensity |
|---|---|---|
| 11.2 | ± 0.2 | m |
| 10.1 | ± 0.2 | m |
| 6.73 | ± 0.2 | w |
| 5.75 | ± 0.1 | w |
| 5.61 | ± 0.1 | w |
| 5.03 | ± 0.1 | w |
| 4.62 | ± 0.1 | w |
| 4.39 | ± 0.08 | w |
| 3.86 | ± 0.07 | vs |
| 3.73 | ± 0.07 | m |
| 3.49 | ± 0.07 | w |
| 3.07 | } ± 0.05 | w |
| 3.00 | | |
| 2.01 | ± 0.02 | w |

The parenthesis around lines 3.07 and 3.00 indicate that they are separate and distinct lines, but are often superimposed. The ZSM-11 X-ray diffraction pattern is similar to that of ZSM-5, except that the lines at interplanar spacings of 10.1, 3.73, 3.00 and 2.01 A are singlets rather than doublets as in the case of ZSM-5.

A silica polymorph having the ZSM-11 X-ray spectrum is described in an article by D. M. Bibby et al. in "Nature" vol. 280, pages 664–665. This silica polymorph, there called "silicalite-2", is prepared by reacting a silica source with tetra-n-butylammonium hydroxide, and optionally ammonium hydroxide or hydrazine hydrate, at 100° C. to 200° C. to form a precursor, which in turn decomposes at 300° C. to yield silicalite-2.

A ZSM-11 with very low aluminium content is also described and claimed in published European Application 14059 in the name of Mobil Oil Corporation as a composition (in terms of moles of oxide) of:

$$(0-10)M_{2/n}O:<0.5Al_2O_3:100SiO_2$$

in which M is a cation of valence n.

A further possibility is that the crystalline silica component of the catalyst is a silica polymorph having the following significant lines in its X-ray pattern:

| Interplanar spacing d (Å) | Relative Intensity |
|---|---|
| 11.9 ± 0.2 | s |
| 10.2 ± 0.2 | m |
| 4.76 ± 0.1 | w |
| 4.29 ± 0.08 | vs |
| 3.87 ± 0.07 | vs |
| 3.66 ± 0.07 | w |
| 3.49 ± 0.07 | w |
| 3.38 ± 0.07 | m |
| 3.20 ± 0.06 | w |
| 3.05 ± 0.05 | w |
| 2.64 ± 0.03 | w |

A silica core of this type may be obtained, for example, by calcination of an organosilicate as described and claimed in U.S. Pat. No. 4,104,294, assigned to Union Carbide Corporation.

It is also possible to use a variety of other silica cores, which are silica analogues of zeolites.

The modified-silica component of the catalyst is a zeolite having the tetrahedral silica network substituted by an element W which may be a metal or non-metal and having a constraint index of from 1 to 12. The modified-silica zeolite is preferably a zeolite having the ratio of silicon to element W (expressed in terms of the mole ratio of their oxides) of greater than 5, most preferably greater than 12.

Preferably the modified-silica zeolite has a formula (expressed in terms of mole ratio of oxides) as follows:

$$M_{2/n}O:W_{2/x}O:YSiO_2:zH_2O$$

wherein M is at least one cation of valence n, W is the modifying element of valence x, Y is at least 5 and preferably at least 12, and z is from 0 to 40.

The modifying element W is preferably Al, B, Ga, Cr, Fe, V, Ti, Be, As or a combination of the two or more of those elements. Particularly remarkable results have been obtained when W is Al, B or Ga. An example of a modified-silica containing more than one element as W is a gallo/borosilicate. Thus, the modified-silica zeolite is preferably of the formula (expressed in terms of mole ratios of oxides) as follows:

$$M_{2/n}O:W'_2O_3:Y'SiO_2:zH_2O$$

wherein W' is one or more of Al, Ga and B, Y' is at least 12, and preferably 20–5000.

The modified-silica shell preferably has an X-ray diffraction pattern characteristic of the ZSM-5 family. Thus, a preferred aluminosilicate zeolite for the shell is that described in U.S. Pat. Nos. 3,702,886, 4,139,600, GB No. 2033358 U.S. Pat. Nos. 3,709,979, 4,108,881, GB Nos. 1574840, 1553209, ZA Nos. 756744 or 756745. A preferred borosilicate for the shell is described in GB No. 2024790, BE Nos. 859656 or 880858. Preferred gallosilicates are described in GB No. 2023562. Other ZSM-5 type modified-silica zeolites which may be employed include the arsenosilicate described in DT No. 2830830, the ferro-silicate described in EP No. 10572, the chromosilicate described in DT No. 2831630 the vanado-silicate described in DT No. 2831631 and the zeolite containing one or more of iron, aluminum and gallium described in U.S. Pat. No. 4,208,305. It is highly preferred that the silica core and the modified-silica zeolite both have an X-ray diffraction pattern characteristic of the ZSM-5 family.

The proportion of the two components of the catalyst silica core and modified-silica zeolite—are preferably chosen so that the mean ratio of silicon to modifying element W in the composite zeolite (expressed in terms of mole ratios of their oxides) is not less than 7.5, preferably from 15 to 20000, and most preferably from 20 to 500.

The composite zeolite may be prepared by a process in which preformed particles of silica are placed in a crystallization gel for a zeolite comprising a silica source, a source of modifying element W, and optionally an organic template molecule, and the crystallization gel is maintained under appropriate reaction conditions to bring about formation on the silica particles of a modified-silica zeolite having a constraint index of from 1 to 12, the silica and the modified-silica zeolite having substantially the same crystalline structure.

The preparation of the silica particles which ultimately form the core of the composite zeolite is believed to be within the competence of one skilled in the art. For example, one may use the processes described in U.S. Pat. Nos. 4,061,724, 4,073,865, 3,941,871, 4,104,294, European Application 14059 and the Bibby et al. article in "Nature", Vol. 280, pages 664–665.

Equally, techniques known in the art may be used to form the modified-silica zeolite shell, such as described in the patents indicated hereinbefore in relation to the preferred modified-silica zeolites. It is believed to be within the competence of one skilled in the art to select crystallisation conditions appropriate for the crystal structure required for the shell.

By way of illustration, it is pointed out that the modified-silica may be formed upon the silica core using the following techniques. A silica source for the modified-silica, which may be a hydrated silica or colloidal silicon oxide solution, is mixed with a solution of an organic template, such as an alkonium compound. The source of the modifying element W, preferably as an oxide, and an alkali, such as sodium hydroxide, are then added. To this solution the preformed particles of the silica core are added, and the whole is then subjected to heating for an appropriate time to bring about crystallisation of the modified-silica on the silica core. The crystallisation typically is carried out at from 100° C. to 200° C. for from 1 to 30 days.

After crystallisation the product may be washed, dried and heated to destroy any organic compounds.

The catalyst may then be contacted with a solution of an ammonium compound to replace cations by NH$_4^+$ which may then be destroyed by calcination, leaving protons at the acid sites to provide the Bronsted acidity of the catalyst. The calcination steps are preferably carried out at a temperature of from 400|C. to 600|C. and most preferably 400|C. to 450|C.

The catalyst of the invention may be formed in a range of crystallite sizes, but it is prefered to employ a silica core of greater than 0.1μ mean diameter. Most preferably the silica core has a mean diameter of from 0.5μ to 20μ. The complete catalyst has the zeolite formed on the outer surface of the silica core, and this may form a partial or complete layer over the core, or be in the form of discrete particles on the core surface. Scanning electron micrographs show that these catalysts form composite crystallites of similar size to the silica core used, but with a "rough" surface which is believed to result from the formation of the modified silica layer. Suprisingly, it has been found that even only very small amounts of zeolite produce a catalyst with good activity, even though the silica core itself is substantially inactive.

The invention enables catalysts to be prepared with relatively large crystallites, by selecting silica core material with a large particle size—for example, of 10μ or greater diameter. Large crystallites of conventional zeolites are not normally desirable because of the increased effects of diffusion limitation on the overall activity. However, the large crystallites of the present invention have their active sites concentrated in a surface layer so that the effect of diffusion limitation is considerably less. Moreover, the large crystallites of the present invention offer certain advantages. Firstly, the specific outer crystal surface area is decreased, and this is important where selectivity is dependent upon the supression of reactions promoted on the crystallite surface. In the past, such surface reactions were supressed by treatment of the surface of small crystallites to lower the activity, for example by depositing an inert silica layer thereover, but this results in increased resistance and pore blockage. A second advantage of large crystallites of the invention is that by using large particles the channels between adjacent particles are wider so that resistance to interparticle diffusion is lower. This decreased resistance in the inter particle voids may enable the catalyst of the invention to be used commercially in larger extrudates.

Preferably the weight ratio of the silica core to the overlying modified-silica (expressed in terms of the weight ratio of the SiO$_2$ core to the SiO$_2$ in the reaction mixture for the modified-silica) is from 0.5:1 to 25:1, and more preferably from 1:1 to 10:1 and most preferably from 1:1 to 4:1.

The catalysts of the invention are useful as catalyst for hydrocarbon conversion processes in which conventional modified-silica, and particularly the ZSM-5 aluminosilicate, are used.

The catalyst may be used in such hydrocarbon conversion processes as cracking, hydrocracking and other petroleum refining processes including isomerization of n-paraffins and naphthalenes, reforming, aromatization, alkylation of aromatics, isomerization of polyalkyl aromatics, as well as disproportionation and transalkylation reactions of aromatics. However, it has been found particularly useful in the xylene isomerization process for the catalysis of isomerization of xylenes as well as ethylbenzene-destruction by disproportionation and transalkylation reactions. It may be substituted for conventional zeolite catalysts in conventional xylene isomerization reactors.

In use the catalyst of the invention may be employed in a similar manner to existing zeolites, and it is believed to be within the competence of one skilled in the art to incorporate the catalyst into conventional hydrocarbon conversion processes on that basis. By way of illustration, the catalyst of the invention may be employed in xylene isomerization by contacting it with xylenes in the vapour phase, optionally in the presence of gaseous hydrogen, at a temperature of from 200° C. to 500° C., a pressure of from 150 to 500 psig and a weight hourly space velocity of from 1 to 200.

Toluene disproportionation is preferably carried out in the vapour phase in the presence of hydrogen at a temperature of from 350° C. to 550° C., a pressure of 150 to 500 psig, a weight hourly space velocity of from 1 to 200 and a hydrogen to hydrocarbon mole ratio of from 1:1 to 10:1. Upgrading of aromatics with 9 or more carbon atoms by reaction with toluene to form xylenes and ethylbenzene is preferably carried out under similar conditions, although temperatures as low as 300° C. may be employed.

The catalyst of the invention may also require regeneration in prolonged use, but this may be effected in the traditional manner.

The catalyst of the invention may be impregnated with one or more metals having activity as hydrogenation catalysts, such as the metals of group VIII of the Periodic Table and especially nickel or palladium. Conventional techniques may be employed to effect this impregnation.

The following Examples and Test Results are now given, though only by way of illustration, to show certain aspects of the invention in more detail.

EXAMPLES 1-6

Preparation of Composite Catalyst of the Invention

A. Preparation of Silica Core 476 g of silica (as Ludox HS-40 a commercially available colloidal silica) were diluted with 100 ml of water. The formed solution was mixed with 130 ml 20% TPA-OH (by weight) tetrapropylammonium salt solution. To this mixture was added a solution of 33 g NaOH in 100 ml water so as to form a synthesis gel. The gel was placed in two 250 ml polypropylene bottles provided with condensers which were heated in an oil bath for 7 days at 100|C. to bring about crystallisation. After the crystallisation period the crystalline core material was collected, washed and dried.

The core material obtained according to the above procedure had a very strong X-ray diffraction pattern, the d-values of which are shown in Table 1 below, along with those for Union Carbide Corporation's Silicalite (the resolution of the X-ray spectrometer does not enable all the lines defined in U.S. Pat. No. 4,061,724 to be identified). Scanning Electron Photomicrographs showed spherically-shaped crystal aggregates with a particle size of 0.5 micron.

B. Preparation of Composite Catalyst

The general procedure adopted was as follows. Hydrated silica (SiO$_2$.nH$_2$O) was mixed with a hot 20% (by weight) solution of tetrapropylammonium salt for 5 minutes (solution 1).

Sodium hydroxide and a soure of the modifying element W were dissolved in water (solution 2) and solutions 1 and 2 were mixed for 5 minutes. In Examples 2, 4 and 5 where W was gallium a different procedure was employed: $Ga_2O_3$ powder and sodium hydroxide solution were added separately to solution 1.

The core material (prepared as in Step A and/or commercially available Silicalite from Union Carbide Corporation) was then added with water and the whole was mixed for 5 minutes to form a slurry. After pH measurement, the slurry was placed in a Teflon lined autoclave and put in an oven at autogenous pressure.

After crystallisation the product was washed several times, dried at 120|C. and precalcined to destroy organic compounds. The product was then ammonia exchanged to replace sodium by $NH_4^+$ and again calcined to decompose the $NH_4^+$ leaving protons to provide Brönsted acidity.

Details of the amounts of reactant used, the nature of the reactants, the proportion of modified silica to inert silica core and the crystallisation conditions are given in Table 2. The ion exchange and calcination conditions are given in Table 3.

The formed catalysts were characterised using the following techniques and the results are set out in Tables 4 and 5.

X-ray Powder Diffraction

X-ray diffraction patterns were obtained to investigate whether other crystalline phases than the silica core were present but all samples had a strong X-ray pattern similar to the pure core material showing characteristic ZSM-5 lines. An example of an X-ray pattern is given in Table 5 for the catalyst of Example 5.

Elemental Analysis

On all samples the modifying element W to silicon atomic ratios were measured as well as the sodium content after $NH_4^+$ exchange.

Acidity Measurements

The acidity of the catalyst was measured by the TGA technique. The Brønsted acidity was obtained by measuring the amount of u moles lutidine per gram of sample adsorbed at 300° C. after 10 minutes. The total acidity (Brønsted+Lewis) was obtained by measuring the amount of pyridine retained under the same conditions. The Lewis acidity was then determined by substracting the Bronsted acidity from the total acidity.

Electron Microscopic Analysis

All samples were submitted to Scanning Electron Microscopic examination to observe the size and shape of the crystallites. See Table 4.

TABLE 1

| Silica polymorph prepared in Step A | | | Silicalite | | |
|---|---|---|---|---|---|
| 2θ (degrees) | d (Å) | Intensity | 2θ (degrees) | d (Å) | Intensity |
| 7.85 | 11.26 | vs | 7.85 | 11.26 | vs |
| 8.75 | 10.11 | vs | 8.85 | 9.98 | vs |
| 10.85 | 8.15 | vw | 11.85 | 7.47 | vw |
| 11.80 | 7.50 | vw | 13.15 | 6.73 | m |
| 12.00 | 7.38 | vw | 13.90 | 6.37 | m |
| 12.50 | 7.08 | vw | 14.80 | 5.00 | s |
| 12.70 | 6.97 | vw | 15.50 | 5.72 | m |
| 13.15 | 6.73 | w | 15.90 | 5.57 | m |
| 13.85 | 6.39 | w | 16.50 | 5.37 | w |
| 14.70 | 6.03 | m | 17.35 | 5.11 | vw |
| 15.50 | 5.72 | w | 17.70 | 5.01 | m |
| 15.80 | 5.61 | m | 18.15 | 4.89 | vw |
| 16.45 | 5.39 | vw | 19.20 | 4.62 | w |
| 17.15 | 5.17 | vw | 19.90 | 4.46 | vw |
| 17.70 | 5.01 | w | 20.45 | 4.34 | w |
| 19.20 | 4.62 | w | 20.80 | 4.27 | m |
| 20.30 | 4.37 | w | 21.75 | 4.08 | vm |
| 20.75 | 4.28 | w | 22.20 | 4.00 | w |
| 21.75 | 4.09 | vw | 23.00 | 3.87 | vs |
| 22.10 | 4.02 | w | 23.35 | 3.31 | vs |
| 23.05 | 3.86 | vs | 23.70 | 3.75 | s |
| 23.85 | 3.73 | s | 23.90 | 3.72 | vs |
| 24.35 | 3.66 | m | 24.40 | 3.65 | s |
| 25.75 | 3.46 | w | 25.55 | 3.49 | w |
| 26.50 | 3.36 | vw | 25.85 | 3.45 | w |
| 26.85 | 3.32 | w | 26.25 | 3.39 | w |
| 27.30 | 3.27 | vw | 26.60 | 3.35 | w |
| 28.20 | 3.16 | vw | 26.85 | 3.32 | m |
| 29.25 | 3.05 | w | 27.40 | 3.25 | w |
| 29.85 | 2.99 | w | 28.10 | 3.18 | vw |
| 31.10 | 2.88 | vw | 28.40 | 3.14 | vw |
| 32.70 | 2.74 | vw | 29.95 | 2.98 | m |
| 33.45 | 2.68 | vw | 30.25 | 2.95 | w |
| 34.30 | 2.61 | vw | 31.20 | 2.87 | vw |
| 34.45 | 2.60 | vw | 32.75 | 2.73 | vw |
| 34.65 | 2.59 | vw | 33.40 | 2.68 | vw |
| 34.90 | 2.57 | vw | 33.75 | 2.66 | vw |
| 36.15 | 2.48 | vw | 34.40 | 2.61 | vw |
| 37.40 | 2.40 | vw | 35.00 | 2.56 | vw |
| 45.10 | 2.01 | vw | 35.70 | 2.51 | vw |
| 45.45 | 2.00 | vw | 36.10 | 2.49 | vw |
| 46.40 | 1.96 | vw | 37.20 | 2.42 | vw |
| 47.40 | 1.92 | vw | 37.50 | 2.40 | vw |
| 48.60 | 1.87 | vw | 43.50 | 2.08 | vw |
| | | | 45.15 | 2.01 | w |
| | | | 45.50 | 1.99 | w |
| | | | 46.45 | 1.95 | vw |
| | | | 47.50 | 1.91 | vw |
| | | | 48.75 | 1.87 | vw |
| | | | 51.98 | 1.76 | vw |
| | | | 55.00 | 1.67 | vw |
| | | | 55.20 | 1.56 | vw |
| | | | 62.35 | 1.49 | vw |
| | | | 63.65 | 1.46 | vw |
| | | | 64.60 | 1.45 | vw |
| | | | 67.15 | 1.39 | vw |

TABLE 2

| | REACTANTS FOR SHELL | | | | MOLE RATIOS OF REACTANTS | | | |
|---|---|---|---|---|---|---|---|---|
| EXAMPLE | template form | cation | metal source | silicon source | INERT CORE | Metal/Si | $H_2O$/$SiO_2$ | $H_2O$/$OH^-$ | TPA/(TPA+NA) |
| 1 | TPA-BR | Na | $NaAlO_2$ | Ludox LS30 | Silicalite(1) | 0.08 | 17 | 22 | 0.5 |
| 2 | TPA-OH | Na | $H_3BO_3$ | $SiO_2$—$nH_2O$ | Silicalite(3) + A | 0.10 | 34 | 56 | 0.6 |
| 3 | TPA-OH | Na | $Ga_2O_3$ | $SiO_2$—$nH_2O$ | Silicalite | 0.06 | 36 | 57 | 0.6 |
| 4 | TPA-OH | Na | $Ga_2O_3$ | $SiO_2$—$nH_2O$ | A(2) | 0.06 | 34 | 51 | 0.6 |
| 5 | TPA-OH | Na | $Ga_2O_3$ | $SiO_2$—$nH_2O$ | A | 0.06 | 34 | 51 | 0.6 |
| 6 | TPA-OH | Na | $Ga_2O_3$ | $SiO_2$—$nH_2O$ | A | 0.06 | 34 | 51 | 0.6 |

TABLE 2-continued

| EXAMPLE | CRYSTALLISATION time days | CRYSTALLISATION temp |C. | Wt. RATIO CORE/modified silica | OVERALL MERIT/SILICON ATOMIC RATIOS expected | OVERALL MERIT/SILICON ATOMIC RATIOS actual |
|---|---|---|---|---|---|
| 1 | 7 | 175 | 1.5 | 0.04 | 0.032 |
| 2 | 7 | 150 | 4.6 | 0.018 | 0.008 |
| 3 | 4 | 175 | 3.0 | 0.015 | 0.019 |
| 4 | 4 | 170 | 3.0 | 0.015 | 0.019 |
| 5 | 4 | 170 | 6.0 | 0.009 | 0.011 |
| 6 | 4 | 170 | 9.0 | 0.006 | 0.006 |

(1)Silica polymorph available from Union Carbide Corporation.
(2)Silica prepared as in Step A of Example 1-6.
(3)Mixture of Silicalite and silica from Step A in the weight ratio 3:2.

TABLE 3

| Example | pH REACTANT MIXTURE before synthesis | pH REACTANT MIXTURE after synthesis | DRIED WEIGHT grams | PRECALCINATION IN AIR time hrs | PRECALCINATION IN AIR temp |C. | PRECALCINATION IN AIR wt loss % | NH4 EXCHANGE time hrs | NH4 EXCHANGE temp |C. | FINAL CALCINATION IN AIR time hrs | FINAL CALCINATION IN AIR temp |C. | FINAL CALCINATION IN AIR wt loss % |
|---|---|---|---|---|---|---|---|---|---|---|---|
| 1 | | | 42 | 16 | 400 | | 2 | 90 | 16 | 400 | |
| 2 | 13.5 | 13.1 | 28.6 | 16 | 400 | 14.5 | 2 | 90 | 16 | 400 | 1.7 |
| 3 | 13.5 | 12.8 | 19.6 | 16 | 400 | 3.9 | 2 | 90 | 16 | 400 | 1.2 |
| 4 | 13.8 | 13.2 | 14.9 | 16 | 400 | 11.3 | 2.5 | 90 | 18 | 400 | 1.3 |
| 5 | 13.9 | 13.3 | 26.9 | 16 | 400 | 12.1 | 2.5 | 90 | 18 | 400/475 | 1.1/1.6(1) |
| 6 | 13.8 | | 36.8 | 16 | 400 | 12.4 | 2.5 | 90 | 18 | 400/475 | 1.1/1.3(1) |

(1)The products of Examples 5 and 6 were split in three portions, one left uncalcined (after exchange), the second and third portions were calcined at 400 to 475| C. respectively.

TABLE 4

| CATALYST | ELEMENTAL ANALYSIS Si % | Na ppm | B ppm | Ga % | Al % | ACIDITIES (1) Bronsted | Lewis | X-RAY DIFFRACTION | SEM PICTURES Crystal shape | size (μ) | OVERALL METAL/SILICONE ATOMIC Ratio | REMARKS |
|---|---|---|---|---|---|---|---|---|---|---|---|---|
| 1 | 42.1 | 12 | — | — | 1.30 | 570 | 130 | ZSM-5 | spherical | 10 | 0.032 | |
| 2 | 45.9 | 95 | 1500 | — | — | 160 | 65 | ZSM-5 | spherical | 10 | 0.008 | |
| 3 | 44.5 | 95 | — | 2.1 | — | 135 | 89 | ZSM-5 | spherical | 10 | 0.019 | |
| 4 | 44.3 | 125 | — | 2.11 | — | 90 | 20 | ZSM-5 | spherical | 0.5 | 0.019 | |
| 5/1 | 44.8 | 35 | — | 1.2 | — | 80 | 55 | ZSM-5 | spherical | 0.5 | 0.011 | (2) |
| 5/2 | | | | | | 55 | 65 | | | | | |
| 6/1 | 45.6 | 45 | — | 0.7 | — | 70 | 55 | ZSM-5 | spherical | 0.5 | 0.006 | (3) |
| 6/2 | | | | | | 70 | 45 | | | | | |
| I | 42.7 | 1 | — | — | 0.88 | 150 | 105 | ZSM-5 | irregular | 10 | 0.043 | |
| II | n.m. | n.m. | — | 6.3 | — | 290 | 110 | ZSM-5 | irregular | 10 | 0.06 | |

(1) μmol lutidine/pyridine retention per gram catalyst at 300| C. after 10 minutes.
(2) Example 5/1 calcined at 400| C., Example 5/2 calcined at 475| C.
(3) Example 6/1 calcined at 400| C., Example 6/2 calcined at 475| C.
n.m. = not measured

TABLE 5

X-ray pattern of the catalyst of Example 5

| 2θ (degrees) | d (Å) | Intensity |
|---|---|---|
| 8.00 | 11.05 | vs |
| 8.95 | 9.88 | vs |
| 12.00 | 7.38 | vw |
| 12.55 | 7.05 | vw |
| 13.30 | 6.66 | w |
| 14.05 | 6.30 | w |
| 14.90 | 5.95 | m |
| 15.75 | 5.63 | m |
| 16.00 | 5.54 | vw |
| 16.70 | 5.31 | vw |
| 17.35 | 5.11 | vw |
| 17.85 | 4.97 | w |
| 18.35 | 4.83 | vw |
| 18.80 | 4.72 | vw |
| 19.35 | 4.59 | w |
| 20.45 | 4.34 | w |
| 20.95 | 4.24 | w |
| 21.85 | 4.07 | vw |
| 22.30 | 3.99 | w |
| 23.25 | 3.83 | w |
| 24.00 | 3.71 | s |
| 24.50 | 3.63 | m |
| 25.70 | 3.47 | w |
| 26.00 | 3.43 | vw |
| 26.80 | 3.33 | w |
| 27.00 | 3.30 | vw |
| 27.50 | 3.24 | vw |
| 28.25 | 3.16 | vw |
| 28.55 | 3.13 | vw |
| 29.40 | 3.04 | w |
| 30.10 | 2.97 | w |
| 31.30 | 2.86 | vw |
| 32.20 | 2.78 | vw |
| 32.35 | 2.77 | vw |
| 32.90 | 2.72 | vw |
| 33.35 | 2.69 | vw |
| 33.55 | 2.67 | vw |
| 33.80 | 2.65 | vw |
| 34.00 | 2.64 | vw |
| 34.55 | 2.60 | vw |
| 35.90 | 2.50 | vw |
| 36.20 | 2.48 | vw |

TABLE 5-continued

| 2θ (degrees) | d (Å) | Intensity |
|---|---|---|
| 37.35 | 2.41 | vw |
| 37.60 | 2.39 | vw |

EXAMPLES 7-11

Preparation of Gallosilicate Composite Catalyst of the Invention

Using a similar technique to that described in relation to Examples 1-6, four additional catalyst of the invention were prepared with an outer layer of gallosilicate showing the characteristic x-ray diffraction lines of ZSM-5. Core materials of $0.5\mu$ and $10\mu$ were again used. Details of the catalysts obtained are given in Table 6 below.

TABLE 6

| CATALYST | REACTANTS FOR SHELL | | | | ACIDITIES (1) | | X-RAY DIFFRACTION | Crystal size (μ) | OVERALL METAL/ SILICON ATOMIC Ratio |
|---|---|---|---|---|---|---|---|---|---|
| | template | cation | metal source | silicon source | Bronsted | Lewis | | | |
| 7 | TPA—OH | Na | Ga$_2$O$_3$ | SiO$_2$—nH$_2$O | 80 | 200 | ZSM-5 | 10 | 0.006 |
| 8 | TPA—OH | Na | Ga$_2$O$_3$ | SiO$_2$—nH$_2$O | 105 | 80 | ZSM-5 | 10 | 0.01 |
| 9 | TPA—OH | Na | Ga$_2$O$_3$ | SiO$_2$—nH$_2$O | 175 | 50 | ZSM-5 | 10 | 0.023 |
| 10 | TPA—OH | Na | Ga$_2$O$_3$ | SiO$_2$—nH$_2$O | 165 | 15 | ZSM-5 | 0.5 | 0.01 |
| 11 | TPA—OH | Na | Ga$_2$O$_3$ | SiO$_2$—nH$_2$O | 305 | 135 | ZSM-5 | 0.5 | 0.026 |

(1) μmol lutidine/pyridine retention per gram catalyst at 300° C. after 10 minutes.

Test Results

The performance of the examples of catalysts of the invention was compared against the catalytic activity of two conventional catalysts having the same ZSM-5 X-ray pattern and crystal size. Comparative catalyst I was a conventional aluminosilicate ZSM-5 and comparative catalyst II was a gallosilicate analogue of ZSM-5, in each case prepared by the technique described in Step B above but without the addition of the core material. Details of catalysts I and II are given in Table 4.

The catalysts were tested for the following reactions.

(a) Xylene Isomerization

The two xylene isomerization reactions are given by the following two equations:

$$MX \rightleftharpoons PX \quad (1)$$

$$MX \rightleftharpoons OX \quad (2)$$

MX=meta-xylene, PX=para-xylene, OX=ortho-xylene.

The activity of the catalyst for xylene isomerization is expressed as the approach to equilibrium:

PX-Approach to EQM =

$$\frac{\frac{PX}{total\ X}\ (\text{in feed}) - \frac{PX}{total\ X}\ (\text{in product})}{\frac{PX}{total\ X}\ (\text{in feed}) - \frac{PX}{total\ X}\ (\text{at eqm})} \times 100\%$$

For the OX-Approach to EQM a similar definition is used. Results have been based on ratios for PX/Total X and OX/Total X calculated from thermodynamic properties. Where results show greater than 100% approach to equilibrium, this may be due either to minor inaccuracies in the analysis of the product or to temperature dependency of the equilibrium constant.

(b) Ethylbenzene Reduction

The Ethylbenzene Reduction (EBR) is caused by the following four reactions:

$$\text{transalkylation: } EB + X \rightleftharpoons Me\text{-}EB + T \quad (3)$$

$$\text{transalkylation: } EB + X \rightleftharpoons di\text{-}Me\text{-}EB + B \quad (4)$$

$$\text{disproportionation: } 2EB \rightleftharpoons di\text{-}EB + B \quad (5)$$

$$\text{hydrodealkylation: } EB + H_2 \rightarrow B + C_2 \quad (6)$$

EB=ethylbenzene, di-EB=diethylbenzene, Me-EB=methylethyl benzene, di-Me-EB=dimethylethylbenzene, T=toluene, B=benzene, X=xylene.

The EBR is calculated as:

$$EBR = \frac{EB\ (\text{in feed}) - EB\ (\text{in prod})}{EB\ (\text{in feed})} \times 100\%$$

(c) Xylene Reduction

The xylene reduction is caused by the reactions (3) and (4) and by the two following reactions:

$$\text{disproportionation: } 2X \rightleftharpoons T + TMB \quad (7)$$

$$\text{hydrodealkylation: } X + H_2 \rightarrow T + C_1 \quad (8)$$

TMB=trimethylbenzene

The xylene reduction (XR) is calculated as:

$$XR = \frac{total\ X\ (\text{in feed}) - total\ X\ (\text{in prod})}{total\ X\ (\text{in feed})} \times 100\%$$

Method

The kinetic measurements were performed in a U-tube microreactor containing 5 to 10 grams of crushed catalyst pellets (20-40 mesh) containing 15% (by weight) kaolin as binding agent.

All catalysts were tested under the following conditions:

H$_2$/hydrocarbon mole ratio: 4
WHSV: 5
Pressure: 30 bar g
Temperature range: 250° C.-450° C.

Details of the feeds used in each test are given hereinafter.

The feed and product samples were analysed by GLC using a bentone 34/diisodecylphthalate column equipped with a Perkin Elmer AS-100 automatic sampling system. The amount and the breakdown of the gas lost via the gas purge was determined by a Squalane capillary column.

The tests and the results obtained are now described in more detail with reference to the accompanying drawings, in which:

FIG. 1 is a graph showing the PX approach to equilibrium in isomerization of meta-xylene for a variety of reactor temperatures for the catalyst of Example 1 and for comparison catalyst I;

FIG. 2 is a graph showing the OX approach to equilibrium plotted against reactor temperature for the same two catalysts as in FIG. 1;

FIG. 3 is a similar graph to FIG. 1, but showing the results for the catalyst of Example 3 and for comparison catalyst II;

FIG. 4 is a similar graph to FIG. 2, but showing the results for the catalyst of Example 3 and for comparison catalyst II;

FIG. 5 is a graph showing the PX approach to equilibrium in the isomerization of a mixed xylene feed for a variety of reactor temperatures for the catalysts of Example 1 and for comparison catalyst I;

FIG. 6 is a graph showing the OX approach to equilibrium in the same system as FIG. 5;

FIG. 7 is a similar graph to FIG. 5, but showing the results for the catalysts of Examples 2 to 6 and comparison catalyst II;

FIG. 8 is a graph showing the OX approach to equilibrium for the systems of FIG. 7;

Test 1

Isomerization of a Meta-xylene Feed

Figure 10:
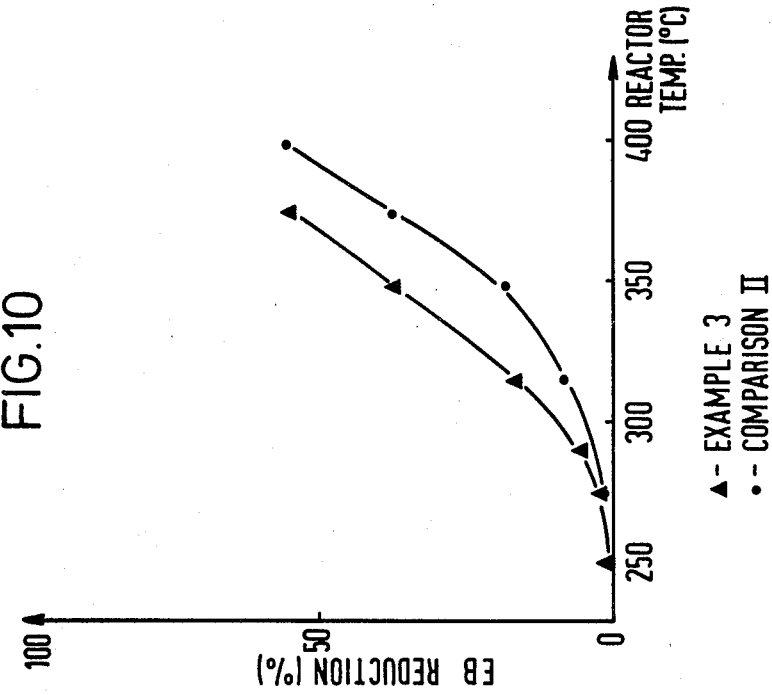
FIG. 10 is a similar graph showing the relation between EBR and reactor temperature for the catalyst of Example 3 and comparison catalyst II.

A substantially pure meta-xylene feed was isomerized under the conditions indicated above for several reactor temperatures using both catalysts of the invention and conventional catalysts. In each case the feed contained 98.8 wt. % meta-xylene.

| Results | | | | | |
|---|---|---|---|---|---|
| (a) Catalyst = Example 1 | | | | | |
| Reactor temperature (°C.) | 250 | 75 | 300 | 325 | 350 |
| XR | | 0.04 | 0.12 | 0.35 | 1.2 | 3.5 |
| PX approach to eqm. | 40.5 | 82.1 | 97.3 | 98.3 | 97.3 |
| OX approach to eqm. | 7.0 | 28.8 | 61.8 | 88.8 | 95.1 |
| (b) Catalyst = Comparison I | | | | | |
| Reactor temperature (°C.) | 275 | 300 | 325 | 350 | 375 |
| XR | 0.2 | 0.2 | 0.3 | 0.9 | 2.8 |
| PX approach to eqm. | 26.6 | 57.3 | 83.9 | 96.4 | 95.3 |
| OX approach to eqm. | 7.2 | 22.0 | 49.8 | 82.2 | 96.2 |
| (c) Catalyst = Example 3 | | | | | |
| Reactor temperature (°C.) | 250 | 275 | 300 | 325 | 350 |
| XR | 0.04 | 0.12 | 0.35 | 1.18 | 3.46 |
| PX approach to eqm. | 40.1 | 81.5 | 96.9 | 97.8 | 97.2 |
| OX approach to eqm. | 7.69 | 30.8 | 64.9 | 92.5 | 97.4 |

| | | | (d) Catalyst = Comparison II | | | | |
|---|---|---|---|---|---|---|---|
| Reactor temperature (°C.) | 275 | 300 | 325 | 350 | 375 | 400 | 425 |
| XR | 0.8 | 0.3 | 0.3 | 0.5 | 1.2 | 2.3 | 4.8 |
| PX approach to eqm. | 7.8 | 23.2 | 49.3 | 82.8 | 99.3 | 98.7 | 97.1 |
| OX approach to eqm. | 2.2 | 4.4 | 13.0 | 34.0 | 61.6 | 82.4 | 95.0 |

These results are significant in that they show the catalysts of the invention, both when the modified silica is an aluminosilicate and a gallosilicate, to be more effective at catalysing the isomerization of meta-xylene than conventional zeolites. As shown clearly by FIGS. 1-4, the catalysts of the invention approach equilibrium for both ortho- and para-xylenes at much lower temperatures than the corresponding conventional zeolites. Difficulties in predicting the outcome of synthesis prevented catalysts of the invention being prepared with identical mean atomic ratios of W:Si to those in the comparison catalysts, but since in each case the catalyst of the invention contained less tervalent metal than the comparison catalyst it would be expected to be less active but the reverse is the case.

Test 2

Isomerization of a Mixed Xylene/Ethylbenzene Feed

A similar test to Test 1 was carried out, but using a feed such as might be encountered in an actual xylene recovery plant.

The feed content is given in each case; it is pointed out that in some instances the feed contained very nearly the equilibrium OX content (in the region of 15 wt. %) so that meaningful figures could not be obtained for OX approach to equilibrium.

| Results | | | | | | |
|---|---|---|---|---|---|---|
| (a) Catalyst = Example 1 | | | | | | |
| 1st run | feed (wt. %) | Non-aromatics | 0.12 | | | |
| | | toluene | 0.65 | | | |
| | | ethylbenzene | 16.48 | | | |
| | | para-xylene | 9.74 | | | |
| | | meta-xylene | 57.26 | | | |
| | | ortho-xylene | 15.16 | | | |
| | | other aromatics | 0.59 | | | |
| Reactor temperature (°C.) | | | 250 | 275 | 300 | 325 | 350 |
| EBR | | | 1.0 | 4.8 | 12.1 | 37.8 | 65.7 |
| XR | | | 50.1 | 0.2 | 1.2 | 4.1 | 11.1 |
| PX approach to eqm. | | | 42.0 | 60.4 | 77.5 | 93.0 | 94.2 |

2nd and 3rd runs
For these runs a mixed feed was prepared to simulate a normal isomerization feed.
The catalyst was that of Example 1, but recalcined.
3rd run figures are in parenthesis

| | | | | |
|---|---|---|---|---|
| feed (wt. %) | non-aromatics | 0.04 | (0.04) | |
| | benzene | 0.05 | (0.05) | |
| | toluene | 0.09 | (0.08) | |

-continued

| | | Results | | | | | |
|---|---|---|---|---|---|---|---|
| | | ethylbenzene | 19.4 | (19.5) | | | |
| | | para-xylene | 9.66 | (9.71) | | | |
| | | meta-xylene | 60.4 | (60.1) | | | |
| | | ortho-xylene | 10.3 | (10.4) | | | |
| | | other aromatics | 0.05 | (0.07) | | | |

| Results | | | | | | | |
|---|---|---|---|---|---|---|---|
| Reactor temp. (°C.) | 250 | 275 | 300 | 325 | 350 | 375 | 400 |
| EBR | 2.26 | 5.56 | 16.3 | 41.3 | 67.5 | 85.0 | 92.8 |
| | (2.0) | (4.36) | (15.5) | (37.4) | (64.2) | (81.6) | (92.2) |
| XR | 0.21 | 0.67 | 1.84 | 5.63 | 13.6 | 23.4 | 32.6 |
| | (—) | (0.20) | (1.05) | (3.66) | (9.72) | (17.4) | (26.6) |
| PX app. to eqm. | 50.4 | 83.2 | 93.2 | 92.6 | 94.9 | 96.5 | 98.0 |
| | (38.5) | (68.1) | (90.4) | (93.3) | (93.9) | (95.9) | (97.8) |
| OX app. to eqm. | 15.6 | 41.0 | 71.2 | 92.2 | 102 | 102 | 103 |
| | (10.6) | (27.0) | (64.6) | (91.2) | (104) | (105) | (105) |

(b) Catalyst = Comparison I

| 1st run | feed (wt. %) | non-aromatics | 0.08 | | | | |
|---|---|---|---|---|---|---|---|
| | | toluene | 0.69 | | | | |
| | | ethylbenzene | 16.40 | | | | |
| | | para-xylene | 9.74 | | | | |
| | | meta-xylene | 56.88 | | | | |
| | | ortho-xylene | 15.65 | | | | |
| | | other aromatics | 0.56 | | | | |

| Reactor temperature (°C.) | 250 | 275 | 300 | 325 | 350 | 375 | 400 |
|---|---|---|---|---|---|---|---|
| EBR | 0.5 | 1.6 | 7.5 | 21.5 | 43.3 | 59.3 | 73.5 |
| XR | 0.1 | 0.2 | 0.5 | 1.3 | 3.5 | 7.0 | 12.7 |
| PX approach to eqm. | 8.8 | 22.1 | 48.9 | 79.5 | 91.0 | 91.8 | 93.0 |

(c) Catalyst = Example 3

| | feed (wt. %) | non-aromatics | 0.05 |
|---|---|---|---|
| | | toluene | 0.11 |
| | | ethylbenzene | 19.0 |
| | | para-xylene | 8.83 |
| | | ortho-xylene | 10.6 |
| | | other aromactics | 0.06 |

Results

| Reactor temperature (°C.) | 250 | 275 | 300 | 325 | 350 | 375 |
|---|---|---|---|---|---|---|
| EBR | 0.53 | 0.95 | 4.37 | 15.7 | 35.6 | 54.0 |
| XR | 0.37 | 0.58 | 0.87 | 2.01 | 4.58 | 9.83 |
| PX approach to eqm. | 28.8 | 55.3 | 87.1 | 92.4 | 95.7 | 96.8 |
| OX approach to eqm. | 12.4 | 27.0 | 61.6 | 80.9 | 93.9 | 98.0 |

A second run was carried out using the catalyst of Example 3 after a further calcination.

| | feed (wt. %) | non-aromatics | 0.03 |
|---|---|---|---|
| | | benzene | 0.04 |
| | | toluene | 0.08 |
| | | ethylbenzene | 19.5 |
| | | para-xylene | 9.61 |
| | | meta-xylene | 60.3 |
| | | ortho-xylene | 10.4 |
| | | other aromatics | 0.05 |

Results

| Reactor temperature (°C.) | 275 | 300 | 325 | 350 | 375 |
|---|---|---|---|---|---|
| EBR | 4.47 | 6.47 | 18.0 | 37.3 | 53.8 |
| XR | — | 0 | 0.99 | 3.21 | 6.98 |
| PX approach to eqm. | 53.6 | 81.5 | 95.7 | 96.7 | 97.5 |
| OX approach to eqm. | 24.4 | 52.5 | 86.1 | 98.1 | 102 |

(d) Catalyst = Example 4

| | feed (wt. %) | non-aromatics | 0.04 |
|---|---|---|---|
| | | benzene | 0.03 |
| | | toluene | 0.08 |
| | | ethylbenzene | 19.5 |
| | | para-xylene | 9.68 |
| | | meta-xylene | 60.5 |
| | | ortho-xylene | 10.1 |
| | | other aromatics | 0.03 |

Results

| Reactor temperature (°C.) | 300 | 325 | 350 | 375 | 400 | 425 | 450 |
|---|---|---|---|---|---|---|---|
| EBR | 1.44 | 6.62 | 20.1 | 37.5 | 53.0 | 62.4 | 72.7 |
| XR | 0.73 | 1.32 | 2.65 | 5.55 | 9.94 | 13.2 | 17.6 |
| PX approach to eqm. | 87.7 | 89.3 | 98.7 | 97.5 | 99.4 | 100 | 103 |
| OX approach to eqm. | 63.1 | 78.8 | 99.4 | 99.8 | 103 | 102 | 103 |

(e) Catalyst = Example 5/1

| | feed (wt. %) | non-aromatics | 0.03 |
|---|---|---|---|
| | | benzene | 0.03 |

-continued

| Results | | |
|---|---|---|
| | toluene | 0.08 |
| | ethylbenzene | 19.5 |
| | para-xylene | 9.82 |
| | meta-xylene | 60.3 |
| | ortho-xylene | 10.2 |
| | other aromatics | 0.03 |

Results

| Reactor temperature (°C.) | 275 | 300 | 325 | 350 | 375 | 400 | 425 |
|---|---|---|---|---|---|---|---|
| EBR | — | 2.15 | 6.92 | 15.6 | 33.0 | 49.9 | 59.3 |
| XR | 0.25 | 0.21 | 0.14 | 1.32 | 3.61 | 7.54 | 11.5 |
| PX approach to eqm. | 17.5 | 54.2 | 88.3 | 95.0 | 97.3 | 98.0 | 98.6 |
| OX approach to eqm. | 12.1 | 35.8 | 70.8 | 88.8 | 97.0 | 99.2 | 98.9 |

(f) Catalyst = Example 6/1

| feed (wt. %) | | |
|---|---|---|
| | non aromatics | 0.04 |
| | benzene | 0.02 |
| | toluene | 0.08 |
| | ethylbenzene | 19.6 |
| | para-xylene | 9.8 |
| | meta-xylene | 60.1 |
| | ortho-xylene | 10.2 |
| | other aromatics | 0.02 |

Results

| Reactor temperature (°C.) | 275 | 300 | 325 | 350 | 375 | 400 | 425 |
|---|---|---|---|---|---|---|---|
| EBR | 0.30 | 1.37 | 4.48 | 13.9 | 31.6 | 48.5 | 57.8 |
| XR | 0.16 | 0.2 | 0.47 | 1.21 | 3.29 | 6.92 | 10.4 |
| PX approach to eqm. | 17.1 | 48.6 | 84.2 | 95.7 | 98.2 | 98.7 | 99.0 |
| OX approach to eqm. | 11.6 | 36.2 | 70.2 | 91.3 | 99.0 | 100 | 100 |

(g) Catalyst = Example 6/2

| feed (wt. %) | | |
|---|---|---|
| | non-aromatics | 0.04 |
| | benzene | 0.03 |
| | toluene | 0.08 |
| | ethylbenzene | 19.43 |
| | para-xylene | 9.76 |
| | meta-xylene | 60.39 |
| | ortho-xylene | 10.25 |
| | other aromatics | 0.02 |

Results

| Reactor temperature (°C.) | 275 | 300 | 325 | 350 | 375 | 400 | 425 |
|---|---|---|---|---|---|---|---|
| EBR | 0.6 | 1.4 | 5.1 | 15.7 | 33.9 | 49.4 | 61.1 |
| XR | 0.3 | 0.4 | 0.8 | 1.7 | 4.2 | 7.7 | 12.3 |
| PX approach to eqm. | 32.5 | 64.2 | 92.4 | 96.6 | 96.6 | 98.2 | 99.1 |
| OX approach to eqm. | 18.6 | 46.1 | 80.6 | 95.8 | 98.0 | 100 | 102 |

(h) Catalyst = Comparison II

| feed (wt. %) | | |
|---|---|---|
| | non-aromatics | 0.12 |
| | toluene | 0.43 |
| | ethylbenzene | 19.93 |
| | para-xylene | 9.86 |
| | meta-xylene | 55.75 |
| | ortho-xylene | 13.57 |
| | other aromatics | 0.34 |

Results

| Reactor temperature (°C.) | 275 | 300 | 325 | 350 | 375 | 400 | 425 |
|---|---|---|---|---|---|---|---|
| EBR | 2.1 | 1.9 | 5.1 | 13.2 | 30.6 | 50.5 | 72.8 |
| XR | — | — | 0.3 | 0.8 | 2.1 | 4.6 | 7.6 |
| PX approach to eqm. | 14.8 | 27.0 | 54.8 | 79.1 | 92.2 | 93.9 | 94.8 |
| OX approach to eqm. | — | 5.3 | 20.4 | 39.5 | 61.5 | 86.4 | 103 |

(i) Catalyst = Example 2

| feed (wt. %) | | |
|---|---|---|
| | non-aromatics | 0.04 |
| | benzene | 0.03 |
| | toluene | 0.08 |
| | ethylbenzene | 19.5 |
| | para-xylene | 9.71 |
| | meta-xylene | 60.4 |
| | ortho-xylene | 10.2 |
| | other aromatics | 0.02 |

Results

| Reactor temperature (°C.) | 300 | 325 | 350 | 375 | 400 | 425 |
|---|---|---|---|---|---|---|
| EBR | 1.38 | 4.04 | 12.2 | 27.4 | 41.5 | 56.8 |
| XR | 0.62 | 0.52 | 1.18 | 2.68 | 4.81 | 9.04 |
| PX approach to eqm. | 57.3 | 82.9 | 93.5 | 98.0 | 96.8 | 99.0 |
| OX approach to eqm. | 26.5 | 54.9 | 77.4 | 94.5 | 96.2 | 101 |

The results given above demonstrate that the catalysts of the invention perform better as isomerization catalysts than the corresponding conventional catalysts even when used with a feed containing ethylbenzene.

Figure 9:
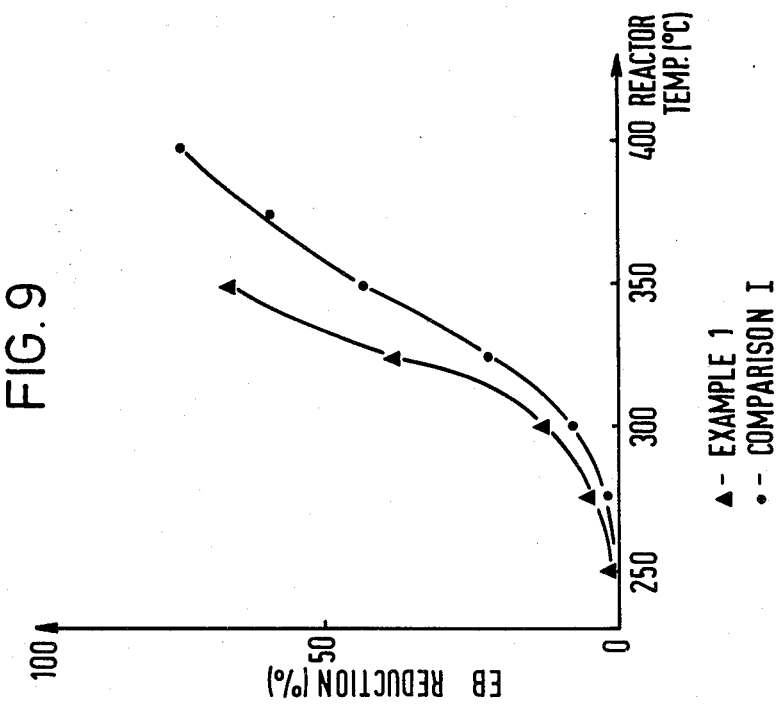
FIG. 9 is a graph showing the EB reduction at a number of reactor temperatures in isomerization of a mixed xylene feed for the catalyst of Example 1 and comparison catalyst I.

The advantages of the catalysts of the invention can be seen by the graphs in FIGS. 5 to 10.

It is pointed out that there is no comparison provided for the catalyst of Example 2. Attempts were made to synthesise borosilicate zeolites using the procedure of Step B hereinbefore, but omitting the silica core material. It was found that no significant amount of borosilicate zeolite was formed. This highlights another advantage of the invention, in that highly crystalline and highly active zeolite catalysts may be prepared, even when conventional zeolites are difficult to prepare with the same tervalent element in the tetrahedral structure.

Test 3

Comparison of Pre-exponential Factor in Rate Equations for Xylene Isomerization To compare the activities of catalysts a simple, but reliable kinetic model has been developed for xylene isomerization. It is assumed that the reaction rate of xylene isomerization (either ortho- or para-xylene) is described by the following first order rate equation:

$$\text{rate} = K_1(C - C_{eq})$$

where C is xylene concentration, $C_{eq}$ is the equilibrium xylene concentration and $K_1$ is the rate constant which will be dependent on temperature as described by the Arrhenius equation:

$$K_1 = K_o C^{-E/RT}$$

where $K_o$ is the pre-exponential factor, E is the activation energy and T is the temperature. $K_o$ provides a measure of isomerization activity independent of temperature.

Further, the activity per active site (i.e. per atom of modifying element in the composite zeolite) may be compared by means of parameter a, where:

$$a = \frac{K_o}{\text{atomic ratio}}$$

the atomic ratio being the ratio of modifying element to silicon.

These parameters are shown for Examples 1 to 11 and the comparative catalysts in Table 7 below. The catalysts of Examples 7 to 11 were investigated for approach to ortho-xylene equilibrium and approach to para-xylene equilibrium as described hereinbefore, and the parameters $K_o$ and a calculated from the results obtained. It was surprisingly found that significant variations were not seen in these parameters for the xylene isomerization reaction when the ethyl benzene content of the feed was varied.

TABLE 7

| Catalyst | W | Atomic Ratio W/Si | Isomerization Activity $K_o$(PX) | Isomerization Activity $K_o$(OX) | Activity Per Site a(PX) | Activity Per Site a(OX) |
|---|---|---|---|---|---|---|
| Example 1 | Al | 0.032 | 20 | 4 | 625 | 125 |
| Example 2 | B | 0.008 | 3 | 1 | 375 | 125 |
| Example 3 | Ga | 0.018 | 10 | 4 | 550 | 220 |
| Example 4 | Ga | 0.019 | 10 | 6 | 476 | 285 |
| Example 5 | Ga | 0.004 | 4 | 2.5 | 1000 | 625 |
| Example 6 | Ga | 0.003 | 2.5 | 2 | 833 | 667 |
| Example 7 | Ga | 0.006 | 0.5 | 0.2 | 85 | 27 |
| Example 8 | Ga | 0.01 | 5 | 3 | 500 | 300 |
| Example 9 | Ga | 0.023 | 6 | 2 | 230 | 77 |
| Example 10 | Ga | 0.01 | 5 | 2 | 500 | 200 |
| Example 11 | Ga | 0.026 | 20 | 6 | 740 | 220 |
| Comparison I | Al | 0.043 | 3 | 1 | 70 | 25 |
| Comparison II | Ga | 0.06 | 1 | 0.2 | 17 | 3 |

In each case the activity per site of the catalysts of the invention is very much higher than the conventional zeolite catalysts.

I claim:

1. A catalyst composition comprising a crystalline modified-silica zeolite having a constraint index of from 1 to 12 overlying a silica core having substantially the same crystalline structure as the modified-silica zeolite.

2. A catalyst composition comprising a crystalline modified-silica zeolite having a constraint index of from 1 to 12 overlying a silica core, in which the silica core is a silica polymorph of analogous structure to the modified-silica zeolite, so that the silica core alone and the complete catalyst display substantially the same x-ray diffraction patterns.

3. A composition as claimed in claim 1, in which the silica core is a silica polymorph having, after calcination in air for at least one hour at 600° C., a mean refractive index of $1.39 \pm 0.01$ and a specific gravity at 25° C. of $1.70 \pm 0.05$.

4. A composition as claimed in claim 3, in which the silica core is a silica polymorph having an X-ray powder diffraction pattern in which the six strongest d-values are:

$11.1 \pm 0.2$ Å

$10.0 \pm 0.2$ Å

$3.85 \pm 0.07$ Å

$3.82 \pm 0.07$ Å

$3.76 \pm 0.05$ Å

$3.72 \pm 0.05$ Å

5. A composition as claimed in claim 3, in which the silica polymorph has a pore diameter in the range of from 5 to 6 Ångstrom units and a pore volume of 0.18 ml/g, determined by adsorption.

6. A composition as claimed in claim 3, in which the silica polymorph has, following calcination in air for at least an hour at 600° C., an adsorptive capacity for water vapour at 23° C. and a water vapour pressure of 4.6 mm Hg of less than 1 wt. %, an infra-red spectrum which exhibits a substantial absence of absorption in the region of 3700–3100 cm$^{-1}$, and an X-ray powder diffraction pattern containing at least the following d-values:

$11.1 \pm 0.2$ $10.0 \pm 0.2$ $9.75 \pm 0.1$ $3.85 \pm 0.04$ $3.82 \pm 0.04$ $3.71 \pm 0.02$ 3.62±0.02 and showing an absence of reflections intermediate the reflections corresponding to d-spacings of 3.82±0.04 Å and 3.71±0.02 Å.

7. A composition as claimed in claim 1, in which the silica core is a silicate resulting from thermal treatment at a temperature of from 200° C. to 600° C. for from 1 to 48 hours of a crystal metal organosilicate having a composition, in its anhydous state, in terms of mole ratios of oxides as follows:

$$0.9\pm0.2(xR_2O+(1-x)M_{2/n}O):<0.005Al_2O_3:>1$$

where M is sodium or sodium in combination with tin, calcium, nickel or zinc, R is a tetraalkylammonium and x is a number greater than 0 but not exceeding 1, the organosilicate having the following characteristic X-ray diffraction lines:

| Interplanar spacing d (Å) | | Relative Intensity |
|---|---|---|
| 11.1 | ± 0.2 | s |
| 10.0 | ± 0.2 | s |
| 7.4 | ± 0.15 | w |
| 7.1 | ± 0.15 | w |
| 6.3 | ± 0.1 | w |
| 6.04 | | |
| 5.97 | ± 0.1 | w |
| 5.56 | ± 0.1 | w |
| 5.01 | ± 0.1 | w |
| 4.60 | ± 0.08 | w |
| 4.25 | ± 0.08 | w |
| 3.85 | ± 0.07 | vs |
| 3.71 | ± 0.05 | s |
| 3.04 | ± 0.03 | w |
| 2.99 | ± 0.02 | w |
| 2.94 | ± 0.02 | w |

8. A composition as claimed in claim 1, in which the silica core has the following characteristic X-ray diffraction pattern:

| Interplanar spacing d (Å) | | Relative Intensity |
|---|---|---|
| 11.2 | ± 0.2 | m |
| 10.1 | ± 0.2 | m |
| 6.73 | ± 0.2 | w |
| 5.75 | ± 0.1 | w |
| 5.61 | ± 0.1 | w |
| 5.03 | ± 0.1 | w |
| 4.62 | ± 0.1 | w |
| 4.39 | ± 0.08 | w |
| 3.86 | ± 0.07 | vs |
| 3.73 | + 0.07 | m |
| 3.49 | ± 0.07 | w |
| 3.07 | | |
| 3.00 | ± 0.05 | w |
| 2.01 | ± 0.02 | w |

9. A composition as claimed in claim 1, in which the silica core is a silica having the following significant lines in its X-ray pattern:

| Interplanar spacing d (Å) | Relative Intensity |
|---|---|
| 11.9 ± 0.2 | s |
| 10.2 ± 0.2 | m |
| 4.76 ± 0.1 | w |
| 4.29 ± 0.08 | vs |
| 3.87 ± 0.07 | vs |
| 3.66 ± 0.07 | w |
| 3.49 ± 0.07 | w |

| Interplanar spacing d (Å) | Relative Intensity |
|---|---|
| 3.38 ± 0.07 | m |
| 3.20 ± 0.06 | w |
| 3.05 ± 0.05 | w |
| 2.64 ± 0.03 | w |

10. A composition as claimed in claim 1, in which the silica core alone and the catalyst composition display the significant x-ray diffraction lines of a ZSM-5 zeolite.

11. A composition as claimed in claim 1 in which the modified-silica zeolite has a formula expressed in terms of the mole ratios of oxides as follows:

$$M_{2/n}O:W_{2/x}O:YSiO_2:zH_2O$$

wherein M is at least one cation of valence n, W is the modifying element of valence x, Y is at least 5 and z is from 0 to 40.

12. A composition as claimed in claims 11, in which the modifying element W is Al, B, Ga, Cr, Fe, V, Ti, Be, As or a combination of two or more of those elements.

13. A composition as claimed in claim 11, in which the modified-silica zeolite is of the formula (expressed in terms of mole ratios of oxides):

$$M_{2/n}O:W'_2O_3:Y'SiO_2:zH_2O$$

wherein W' is one or more of Al, Ga and B, Y' is 20–5000, and M, n and z are as defined in claim 11.

14. A composition as claimed in claim 11, in which the mean ratio of silicon to modifying element W or W' in the complete catalyst (expressed in terms of mole ratios of their oxides) is from 20 to 500.

15. A composition as claimed in claim 1, in which the silica core has a crystallite size of greater than 0.1μ mean diameter.

16. A composition as claimed in claim 15, in which the silica core has a crystallite size of from 0.5μ to 20μ mean diameter.

17. A composition as claimed in claim 1, in which the weight ratio of the silica core to the overlying modified-silica zeolite (expressed in terms of the weight ratio of the SiO₂ core to the SiO₂ in the reaction mixture for the modified-silica zeolite) is from 1:1 to 10:1.

18. A composition as claimed in claim 17, in which the weight ratio of the silica core to the overlying modified-silica is from 1:1 to 4:1.

19. A process for the preparation of a composite zeolite comprising a silica core with an overlying modified-silica zeolite having a tetrahedral silica network substituted by a modifying element, in which process preformed particles of silica are placed in a crystallisation gel for the modified-silica zeolite comprising a silica source and a source of the modifying element and the crystallisation gel is maintained under appropriate reaction conditions to bring about formation on the silica particles of a modified-silica zeolite having a constraint index of from 1 to 12, the silica having substantially the same crystalline structure as the modified-silica zeolite.

20. A process as claimed in claim 19, in which the crystallisation gel also contains an organic template compound.

21. A process as claimed in claim 19, in which the weight ratio of the preformed silica particles to SiO₂ in the silica source is from 1:1 to 10:1.

22. A process as claimed in claim 19, in which the crystallisation gel and silica particles are maintained at a temperature of from 100 to 2000 C for from 1 to 30 days.

23. A catalyst composition comprising silica core particles having formed thereon an overlying crystalline modified-silica zeolite with a constraint index of 1 to 12, the modified-silica zeolite and the silica core having substantially the same crystalline structure.

24. A process for the preparation of a composite zeolite comprising a silica core with an overlying modified-silica zeolite having a tetrahedral silica network substituted by a modifying element selected from the class consisting of Al, B, Ga, Cr, Fe, V, Ti, Be, As, or mixtures thereof, in which process preformed particles of silica are placed in a crystallisation gel for the modified-silica zeolite comprising a silica source and a source of the modifying element and the crystallisation gel is maintained under appropriate reaction conditions to bring about formation on the silica particles of a modified-silica zeolite having a constraint index of from 1 to 12, the silica having substantially the same crystalline structure as the modified-silica zeolite.

* * * * *